United States Patent [19]
Bryan, Jr.

[11] 3,802,348
[45] Apr. 9, 1974

[54] TRACK WELDING SYSTEM

[75] Inventor: John F. Bryan, Jr., Dallas, Tex.

[73] Assignee: Trakwork Equipment Company, Irving, Tex.

[22] Filed: Dec. 11, 1972

[21] Appl. No.: 314,166

Related U.S. Application Data

[62] Division of Ser. No. 55,470, July 16, 1970, Pat. No. 3,726,232.

[52] U.S. Cl. .................................. 104/15, 29/484
[51] Int. Cl. .......................................... E01b 31/02
[58] Field of Search ............ 29/487, 484, 401, 486; 104/15

[56] References Cited
UNITED STATES PATENTS

| | | | |
|---|---|---|---|
| 3,366,075 | 1/1968 | Clayborne et al. | 104/15 |
| 700,994 | 5/1902 | Torre et al. | 104/15 |
| 2,250,869 | 7/1941 | Jones et al. | 104/15 |

OTHER PUBLICATIONS
Railway Engineering & Maintenance Cyclopedia (1948) p. 370.

*Primary Examiner*—Robert G. Sheridan
*Assistant Examiner*—Richard A. Bertsch
*Attorney, Agent, or Firm*—Richards, Harris & Medlock

[57] ABSTRACT

A track welding system includes a welding assembly comprising oxyacetylene torches and a pair of gripping mechanisms. In the use of the system, the torches heat the adjacent ends of a pair of rails, and the gripping mechanism engage the heated ends under sufficient force to form a welded joint between the rails. The gripping mechanisms include vertical and horizontal locating assemblies for aligning the nails prior to heating. The vertical and angular positioning of the gripping mechanisms is adjustable to assure proper orientation of the rails after the welded joint is formed.

5 Claims, 9 Drawing Figures

PATENTED APR 9 1974　　　　　　　　　　　　3,802,348

3,802,348

1

TRACK WELDING SYSTEM

CROSS REFERENCE TO RELATED APPLICATION

This application is a division of application Ser. No. 55,470, filed July 16, 1970, now U.S. Pat. No. 3,726,232, granted April 10, 1973.

BACKGROUND OF THE INVENTION

Historically, the rails of railroad tracks and similar structures have been connected by bolted joints. During the use of a track constructed with bolted joints, the joints tend to loosen, which in turn permits the ends of the rails to bend downwardly. As the latter condition progresses, railroad cars and similar rolling stock receive a shock at each joint in the track. This continuous pounding action causes an uncomfortable ride and the clacking sound traditionally associated with railroads.

At the present time, there is a marked trend toward the use of welded joints in railroad tracks and the like. As opposed to bolted joints, welded joints do not loosen during use and do not permit bending of the ends of the rails of a track. Thus, the use of welded joints eliminates the continuous pounding of rolling stock that is characteristic of bolted joints, which in turn results in a considerable reduction in both track maintenance costs and rolling stock maintenance costs. Also, the use of welded joints results in a smoother and quieter ride.

At the present time, two processes for forming welded joints are in use. In accordance with one process, adjacent rails are connected at the site of the track by "THERMIT" welding. Track site welding using induction and/or resistance welding has also been attempted, generally without success.

In accordance with the other process, welded joints are fabricated at a factory. Typically, rails are jointed into quarter-mile long track sections at the factory, and the sections are transported to the track site by train. At the site, adjacent quarter-mile long track sections are joined by THERMIT welding.

The present invention comprises a track welding system in which welded joints are formed at the track site by oxyacetylene welding. Welded joints produced by means of the invention are superior to joints produced by THERMIT welding in that they are more reliable and in that they are produced more economically. Also, the use of the invention eliminates the difficulty and expense involved in transporting quarter-mile long track sections from a factory to a track site.

SUMMARY OF THE INVENTION

In accordance with the preferred embodiment of the invention, a track welding system includes a pair of gripping mechanisms that receive and locate the ends of a pair of rails. The ends of the rails are heated, preferably by oxyacetylene torches, and then the ends of the rails are engaged by the gripping mechanisms to form a welded joint between the rails. The gripping mechanisms include structure for controlling the vertical positioning and the angular relationship of the rails, so that the rails are properly oriented after the welded joint is formed.

DESCRIPTION OF THE DRAWINGS

A more complete understanding of the invention may be had by referring to the following Detailed Description when taken in conjunction with the drawings, wherein.

DETAILED DESCRIPTION

Figure 1A:
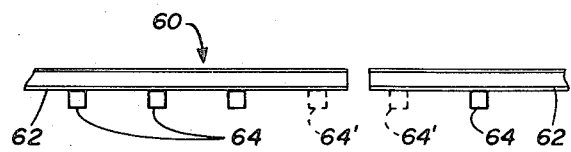
FIGS. 1a, 1b, 1c and 1d are schematic illustrations of progressive steps in the operation of a track welding system incorporating the invention.

Referring now to the drawings, and particularly to FIG. 1, a track welding system 10 employing the present invention is shown. The system 10 includes a self-propelled vehicle 12 and a trailer 14 that is normally coupled to the vehicle 12. The vehicle 12 includes a frame 16 that is supported on four pairs of wheels, including two pairs of flanged wheels 18 and two pairs of unflanged wheels 20. An arm 22 extends downwardly from the frame 16 for actuation by a hydraulic cylinder 24 to raise at least one side of the vehicle 12 during a welding operation. The vehicle 12 is propelled through one of the pairs of flanged wheels 18 by a hydraulic motor (not shown).

A power assembly 28 is supported on one end of the frame 16 of the vehicle 12, and a boom assembly 30 extends from the other end. The power assembly 28 includes an engine and one or more hydraulic pumps which supply hydraulic fluid to the various hydraulic motors and hydraulic cylinders of the track welding system 10. A multiplicity of acetylene bottles 32 are mounted on the frame 16 between the power assembly 28 and the boom assembly 30. The acetylene bottles 32 are preferably positioned on and removed from the vehicle 12 by a hoist assembly 34 that is pivotally supported on the boom assembly 30.

The boom assembly 30 includes a pair of upwardly slanting brace beams 36 and a main beam 38 that extends parallel to the frame 16. A welding assembly 40, including a welding head 42, is supported on the boom assembly 32 by a plurality of cables 44. The vertical position of the welding assembly 40 is controlled by a hydraulic cylinder 46.

The trailer 14 of the track welding system 10 includes a frame 48 and a sperical liquid oxygen bottle 50. Like the frame 16 of the self-propelled vehicle 12, the frame 48 of the trailer 14 is supported on four pairs of wheels, including two pairs of flanged wheels 52 and two pairs of unflanged wheels 54. Oxygen is directed from the bottle 50 to the vehicle 12 through a hose 53. The operation of the track welding system 10 is also illustrated in FIG. 1. Referring first to FIG. 1a, a track 60 includes rails 62 and ties 64. Initially, the ends of the rails 62 are cropped with an abrasive saw. This operation removes the bolted joints between the rails, including the fish plates, the bolts, and the ends of the rails 62 having bolt holes formed in them. Then, the anchors that secure the rails 62 to the ties 64 are removed, the rails 62 are pulled toward each other, and selected ties 64' are removed transversely of the track 60 to provide clearance under the rails 62. During this operation, new rails are added to the track 60 as required.

Figure 1B:
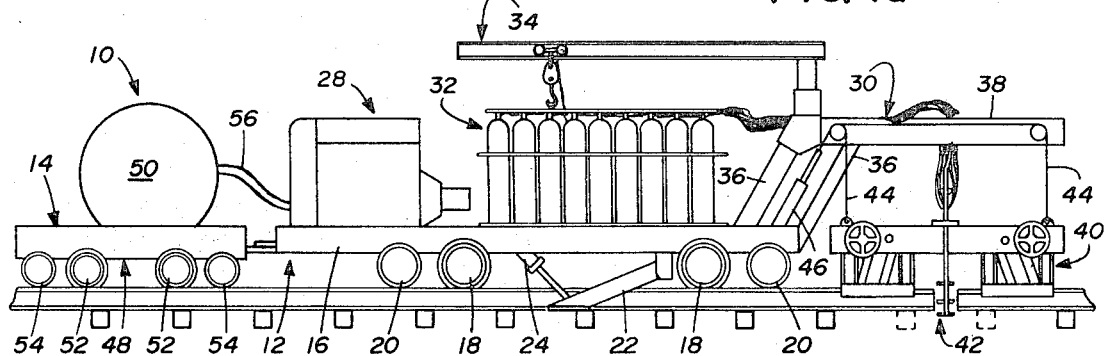

When the rails 62 of the track 60 are properly positioned, the track welding system 10 is moved along the track 60 to the position shown in FIG. 1b. This operation is facilitated by the use of both flanged wheels and unflanged wheels in the track welding system 10, since this construction permits both the movement of the vehicle 12 and the trailer 14 of the system 10 across open joints between the rails 62, and the movement of the vehicle 12 and the trailer 14 around curves in the track 60. As soon as the track welding system 10 is properly positioned, the hydraulic cylinder 24 is actuated to extend to the arm 22. This operation lifts at least one side of the vehicle 12 off of the track 60.

Figure 2:
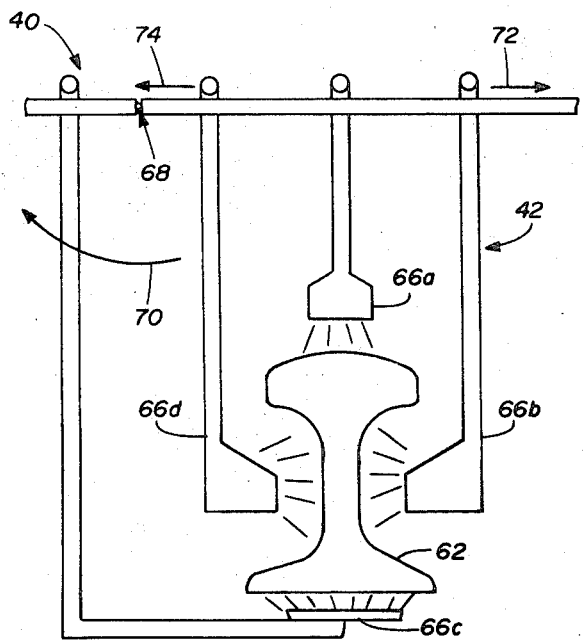
FIG. 2 is a schematic illustration of the welding head of the track welding system shown in FIG. 1.

The next step in the operation of the track welding system 10 comprises forming a welded joint between adjacent rails 62 in the track 60. As is best shown in FIG. 2, the welding head 42 includes four flame heads 66a, 66b, 66c and 66d. The flame heads receive acetylene from the acetylene bottles 30 and oxygen from the oxygen bottle 50, and operate to heat the adjacent ends of the rails 62. When the adjacent ends have been heated to a predetermined temperature, the welding assembly 40 engages the adjacent ends of the rails 62 under a force of about 20,000 pounds, and thereby forms a welded joint between the rails. At the completion of the welding operation, the flame head 66c is pivoted about a hinge 68 in the direction of the arrow 70 and the heads 66b and 66d are moved outwardly in the direction of the arrows 72 and 74, respectively, to permit movement of the track welding system 10 along the rails 62 of the track 60 to the next open joint therein.

Figure 1C:
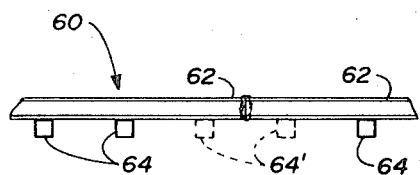
Figure 1D:
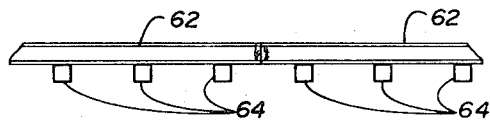

Referring now to FIG. 1c, the operation of the track welding system 10 is completed by trimming the flash from the top and the bottom of the welded joint with a modified abrasive saw. Then the tops of the rails 62 are ground flush to provide a smooth surface extending between the adjacent rails 62 in the track 60. Finally, the ties 64' are returned to their normal position, and the rails 62 of the track 60 are secured to the ties 64 by means of suitable spikes and anchors.

Figure 3:
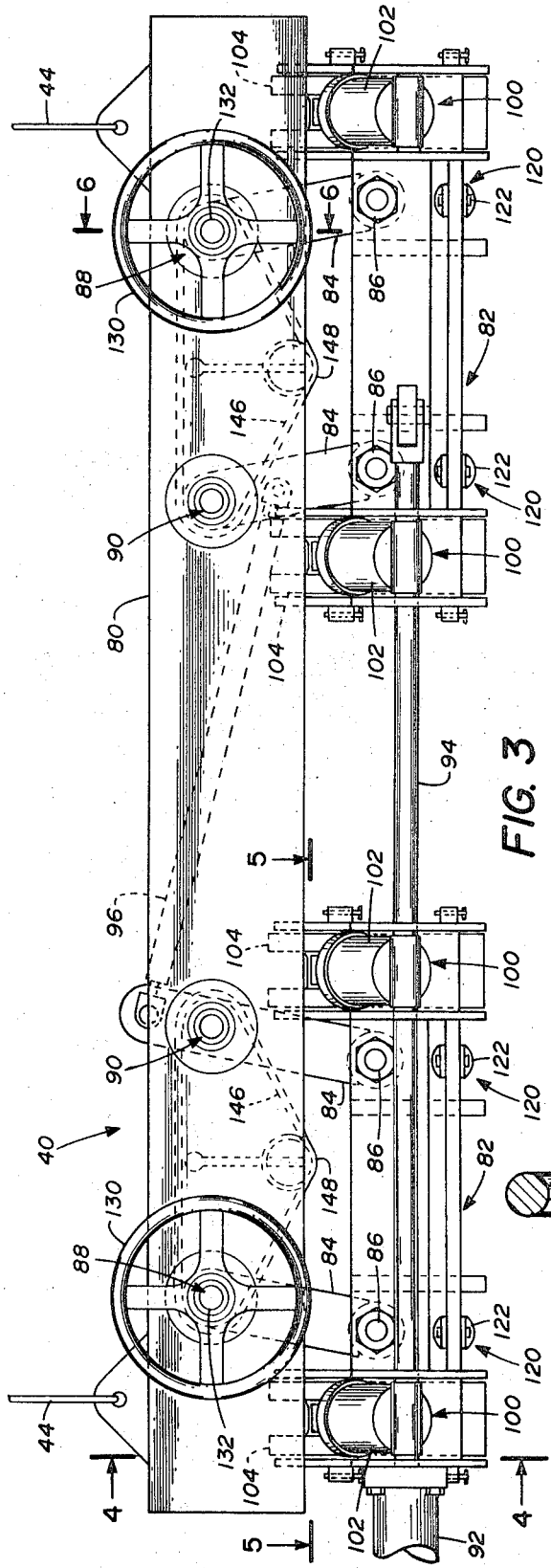
FIG. 3 is a side view of the welding assembly of the track welding system.

Referring now to FIGS. 3-6, the welding assembly 40 of the track welding system 10 is shown in greater detail. As is best shown in FIG. 3, the welding assembly 40 includes a frame 80 and a pair of gripping mechanisms 82. Each gripping mechanism 82 is supported for movement relative to the frame 80 by a pair of parallel links 84. The links 84 extend between bolts 86 on the gripping mechanism 82 and a pair of eccentric mechanisms 88 and 90 mounted in the frame 80.

The movement of the gripping mechanisms 82 relative to the frame 80 is controlled by a pair of hydraulic cylinder assemblies 92. The assemblies 92 are secured to the outboard end of one of the gripping mechanisms 82, and are coupled to the other gripping mechanism 82 through a piston rod 94. In the operation of the welding assembly 40, the hydraulic cylinders 92 move the gripping mechanisms 82 toward each other, and thereby apply the force necessary to form a welded joint between the adjacent ends of a pair or rails mounted in the gripping mechanism 82. During this action, uniform motion between the gripping mechanisms 82 is assured by a link 96 extending between adjacent parallel links 84 in the gripping mechanisms.

Figure 4:
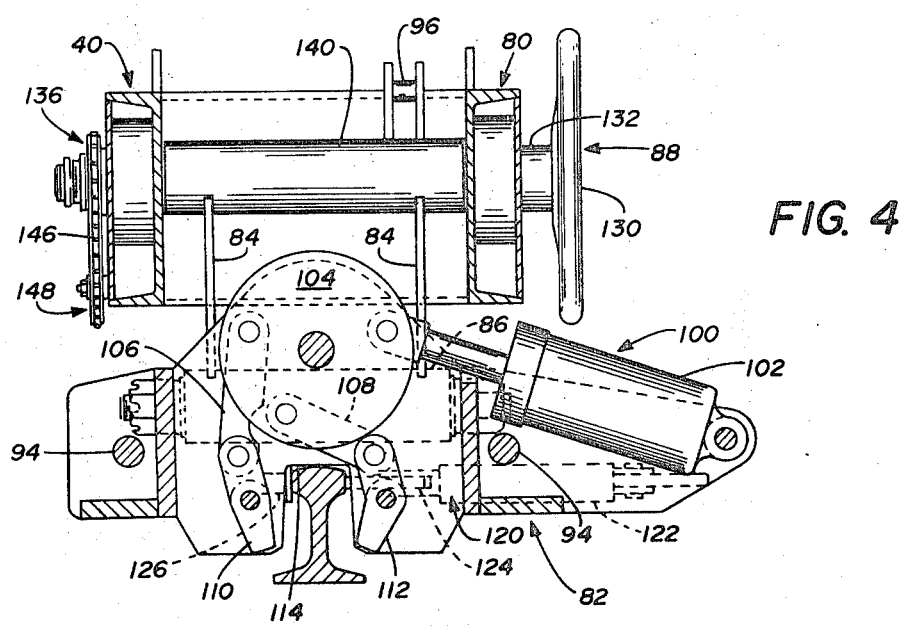
FIG. 4 is a sectional view taken generally along the line 4—4 in FIG. 3 in the direction of the arrows.

As is best shown in FIG. 4, each gripping mechanism 82 includes a pair of vertical rail locating assemblies 100. Each assembly 100 includes a hydraulic cylinder 102 connected between the gripping mechanism 82 and a pivotally supported drive wheel 104. The drive wheel 104 is connected to a pair of drive links 106 and 108 which are in turn connected to a pair of vertical positioning arms 110 and 112. Upon actuation, the cylinder 102 rotates the wheel 104, and the wheel 104 in turn actuates the arms 110 and 112 through the links 106 and 108 to force a rail into engagement with a vertical locating surface 114.

Figure 5:
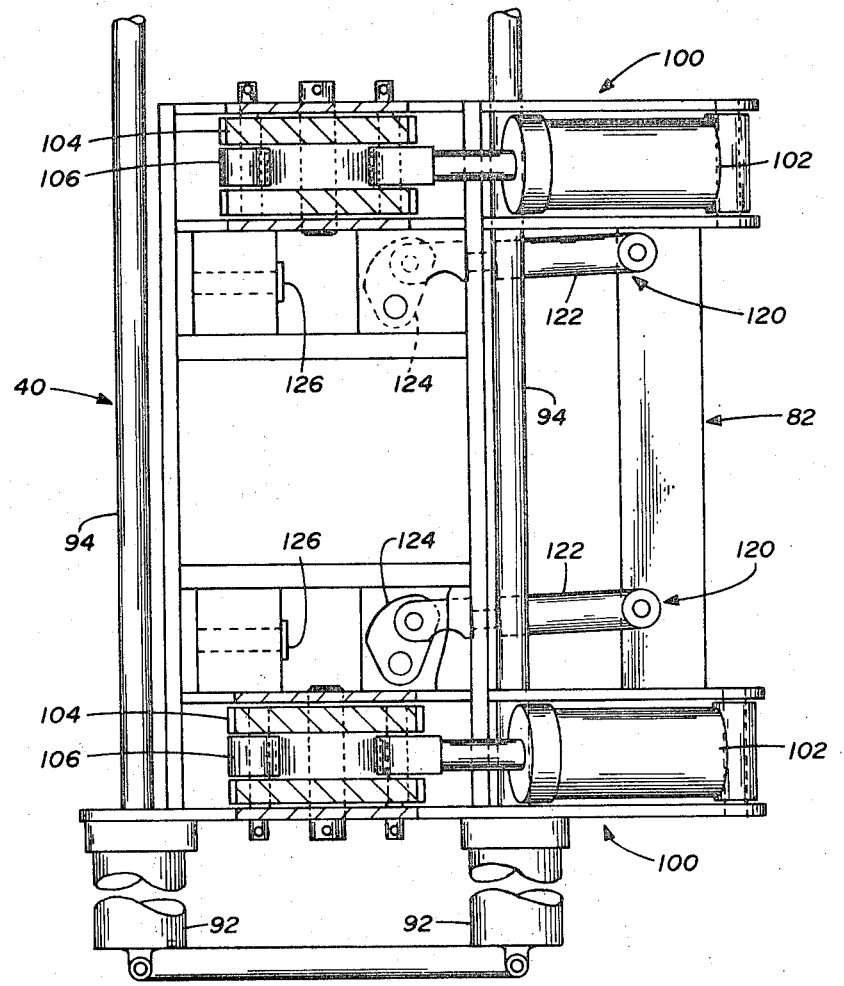
FIG. 5 is a sectional view taken generally along the line 5—5 in FIG. 3 in the direction of the arrows.

Referring now to FIG. 5, each gripping mechanism 82 further includes a pair of horizontal rail locating assemblies 120. Each assembly 120 includes a hydraulic cylinder 122 that is connected between the gripping mechanism 82 and a pivotally supported positioning cam 124. Upon actuation, the cylinder 122 pivots the cam 124 relative to the gripping mechanism 82, and thereby forces a rail into engagement with a locating member 126 mounted in the gripping mechanism 82.

Figure 6:
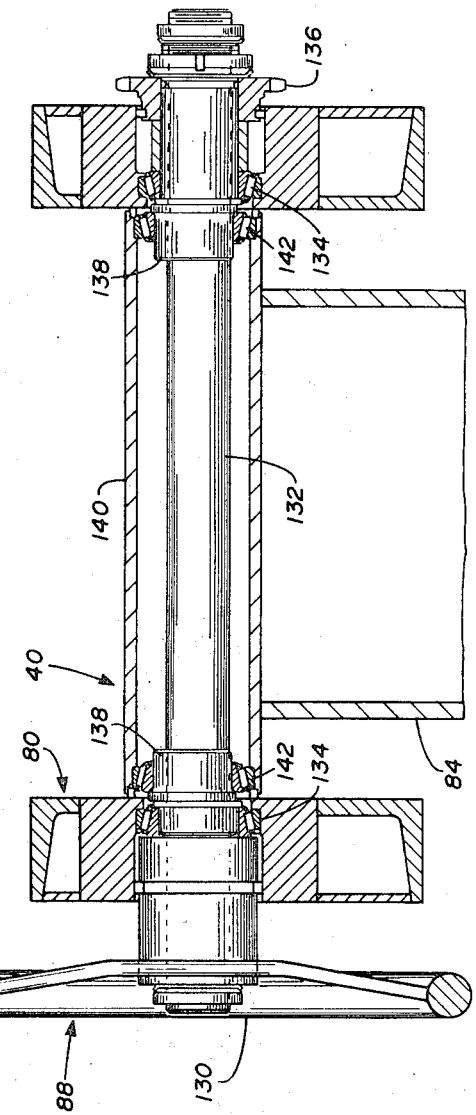
FIG. 6 is an enlarged sectional view taken generally along the line 6—6 in FIG. 3 in the direction of the arrows.

The structural details of the eccentric mechanisms 88 of the welding assembly 40 are illustrated in FIG. 6. Each eccentric mechanism 88 includes a hand wheel 130 that is connected to a shaft 132. The shaft 132 is pivotally supported in the frame 80 of the welding assembly 40 by a pair of bearings 134 and extends from the hand wheel 130 to a sprocket 136. The shaft 132 has a pair of eccentrics 138 formed on it, and a tube 140 is supported on the eccentric 138 by a pair of bearings 142. The parallel link 84 is connected to the tube 140 and, accordingly, the vertical position of the parallel link relative to the frame 80 is controlled by the position of the hand wheel 130.

The eccentric mechanisms 90 of the welding assembly 40 are constructed identically to the eccentric mechanisms 88 with the exception of the hand wheels 130 which are omitted from the mechanisms 90. As is best shown in FIG. 3, the sprockets of the eccentric mechanisms 88 and 90 corresponding to a particular gripping mechanism 82 are interconnected by a chain 146 that extends around an idler sprocket 148. Thus, upon actuation of the hand wheel 130 corresponding to a particular gripping mechanism 82, the entire gripping mechanism is raised or lowered relative to the frame 80 without disturbing the angular relationship between the frame and the gripping mechanism.

Normally, the rails of a particular track are of equal height. In such a case, the vertical positioning assemblies 100 of the welding assembly 40 position the upper surfaces of the rails in alignment with one another, and it is unnecessary to actuate the eccentric mechanisms 88 and 90 of the welding assembly prior to a welding operation. In some cases, however, a particular rail may be worn more than the next adjacent rail. In such an event it may be necessary to center the worn rail relative to the upper and lower surfaces of the unworn rail. When this occurs, the hand wheel 130 corresponding to one of the gripping mechanisms 82 of the welding assembly 40 is operated until the rails are properly oriented relative to each other.

Even though the welding assembly 40 shown in the drawings maintains a precise alignment between a pair of rails during the formation of a welded joint therebetween, a tendency of certain rails to crown, i.e., bow upwardly, or cup, i.e., bow downwardly, during the formation of a welded joint is sometimes noted. When this occurs, it is desirable to vary the orientation of the rails during the formation of a welded joint so that the rails come into alignment after the joint is formed. This is accomplished in the welding assembly 40 by loosening the idler sprokets 148 and removing the chains 146. Then, the eccentric mechanisms 88 and 90 are rotated relative to each other through arcs corresponding to one or two links of the chain 146 to change the angular orientation of the gripping mechanisms 82 relative to the frame 80. This varies the orientation of rails gripped in the gripping mechanisms during a welding operation, so that the rails come into proper alignment after a welded joint is formed between the rails.

The use of track welding systems employing the present invention is advantageous over the prior art in that welded joints are formed at the track site by means of a oxycatylene welding. The system forms welded joints in a rapid and economical manner, and eliminates both the need of transporting quarter-mile long track sections to the track site, and the use of THERMIT welding. Furthermore, the system provides for the welding of rails of different sizes and is adjustable to accomodate any tendency of the rails to crown or cup during the formation of a welded joint.

Although only one embodiment of the invention is illustrated in the drawings and described herein, it will be understood that the invention is not limited to the embodiment disclosed, but is capable of rearrangement, modification and substitution of parts and elements without departing from the spirit of the invention.

What is claimed is:

1. A track welding process including the steps of:

severing the end portions of a pair of adjacent rails in a track and thereby removing a bolted joint from between the rails;

moving at least one of the rails toward the other and positioning the rails to provide a relatively narrow gap between the adjacent ends of the rails;

generating a gas flame around substantially the entire periphery of the adjacent ends of the rails and in the gap therebetween and thereby heating the adjacent ends of the rails to welding temperature;

thereafter immediately forcing the heated rail ends together under predetermined pressure and thereby forming a welded joint between the rails; and maintaining a predetermined vertical and angular positioning of the rails relative to each other during the forcing step and thereby optimizing the resulting welded joint.

2. The track welding process according to claim 1 wherein the step of maintaining a predetermined vertical and angular positioning of the rails is further characterized by:

establishing a predetermined vertical and angular relationship between opposed sets of horizontal and vertical locating surfaces; and maintaining each rail end in engagement with one of the opposed sets of horizontal and vertical locating surfaces during the forcing step.

3. A track welding process comprising:

moving a vehicle along a track to a point over a relatively narrow gap between the adjacent end of a connected rail and a disconnected rail of the track;

engaging the adjacent ends of the rails with opposed sets of horizontal and vertical locating surfaces mounted on the vehicle;

positioning torches mounted on the vehicle around substantially the entire periphery of the adjacent ends of the rails and actuating the torches to direct a gas flame into the narrow gap between the adjacent ends of the rails to heat the adjacent ends of the rails to welding temperature;

thereafter immediately forcing the adjacent ends of the rails into engagement with one another under predetermined pressure and thereby forming a welded joint between the rails; and maintaining a predetermined vertical and angular relationship between the adjacent ends of the rails during the forcing step and thereby assuring a parallel relationship between the axes of the rails after the welded joint is formed.

4. The track welding process according to claim 3 wherein the step of maintaining a predetermined vertical and angular relationship between the adjacent rail ends as the welded joint is formed is further characterized by establishing a predetermined vertical and angular relationship between the opposed sets of horizontal and vertical locating surfaces on the vehicle prior to engagement of the adjacent rail ends therewith.

5. The track welding process according to claim 3 further characterized by lifting the vehicle off of the connected and disconnected rails of the track at least during the forcing step.

* * * * *